(12) United States Patent (10) Patent No.: US 12,570,879 B2
Zhong et al. (45) Date of Patent: Mar. 10, 2026

(54) REMOVABLE ADHESIVE COMPOSITION AND A LABEL CONTAINING IT

(71) Applicant: UPM RAFLATAC OY, Tampere (FI)

(72) Inventors: Yu Zhong, Jiangsu (CN); Bartosz Janicki, Rybnic (PL); Johanna Karhu, Nokia (FI)

(73) Assignee: UPM RAFLATAC OY, Tampere (FI)

( * ) Notice: Subject to any disclaimer, the term of this patent is extended or adjusted under 35 U.S.C. 154(b) by 818 days.

(21) Appl. No.: 17/614,685

(22) PCT Filed: May 31, 2019

(86) PCT No.: PCT/FI2019/050419
§ 371 (c)(1),
(2) Date: Nov. 29, 2021

(87) PCT Pub. No.: WO2020/240075
PCT Pub. Date: Dec. 3, 2020

(65) Prior Publication Data
US 2022/0228043 A1 Jul. 21, 2022

(51) Int. Cl.
*C09J 133/08* (2006.01)
*C09J 7/38* (2018.01)

(52) U.S. Cl.
CPC ............. *C09J 133/08* (2013.01); *C09J 7/385* (2018.01)

(58) Field of Classification Search
CPC combination set(s) only.
See application file for complete search history.

(56) References Cited

U.S. PATENT DOCUMENTS

| | | | | | |
|---|---|---|---|---|---|
| 5,972,447 | A | * | 10/1999 | Hata | C08L 29/04 428/476.3 |
| 6,414,087 | B1 | * | 7/2002 | Hashemzadeh | C08F 220/12 525/191 |
| 2006/0089276 | A1 | * | 4/2006 | Klotz | C10M 173/02 428/423.1 |

| | | | | | |
|---|---|---|---|---|---|
| 2007/0169885 | A1 | * | 7/2007 | Mikuni | C09J 9/00 156/325 |
| 2010/0055361 | A1 | * | 3/2010 | Kawasaki | B29C 61/003 428/327 |
| 2010/0092703 | A1 | * | 4/2010 | Fouquay | C09J 153/02 524/400 |
| 2010/0092774 | A1 | * | 4/2010 | Schoecker | C09J 133/066 524/558 |
| 2011/0244160 | A1 | * | 10/2011 | Ishiguro | C09J 7/22 428/41.5 |
| 2012/0213992 | A1 | * | 8/2012 | Gerst | C09J 133/06 427/208.4 |
| 2015/0284598 | A1 | * | 10/2015 | Wiegers | C09D 175/04 156/704 |
| 2015/0361312 | A1 | * | 12/2015 | Chen | C09J 123/0853 156/60 |
| 2016/0068719 | A1 | * | 3/2016 | Sato | C09J 133/08 525/115 |
| 2016/0303833 | A1 | * | 10/2016 | Wang | B32B 5/18 |
| 2016/0351082 | A1 | | 12/2016 | Barnhardt | G09F 3/02 |
| 2016/0351083 | A1 | * | 12/2016 | Barnhardt | B32B 27/38 |
| 2017/0132956 | A1 | * | 5/2017 | Galoff | G09F 3/10 |
| 2018/0265747 | A1 | * | 9/2018 | Karhu | C09J 133/08 |
| 2019/0009491 | A1 | * | 1/2019 | Iwasawa | G09F 3/0292 |
| 2020/0199415 | A1 | * | 6/2020 | Kot | C09J 7/21 |

FOREIGN PATENT DOCUMENTS

| | | | | |
|---|---|---|---|---|
| JP | 57139163 | A | * | 8/1982 |
| JP | H0881668 | A | | 3/1996 |
| JP | 2001146084 | A | | 5/2001 |
| WO | 2014105380 | A1 | | 7/2014 |
| WO | 2018118898 | A1 | | 6/2018 |

OTHER PUBLICATIONS

Machine Translation of JP-57139163-A, 2024 (Year: 2024).*
International Search Report for the corresponding International Application No. PCT/FI2019/050419; International Filing Date: May 31, 2019; Date of Mailing: Feb. 27, 2020; 5 pages.

* cited by examiner

*Primary Examiner* — Liam J Heincer
(74) *Attorney, Agent, or Firm* — Nixon Peabody LLP

(57) ABSTRACT

The invention relates to a removable adhesive composition and uses of the adhesive composition in different kinds of labels and label laminate applications. In addition, the present invention relates to a label and a label laminate containing the removable adhesive composition.

30 Claims, 5 Drawing Sheets

REMOVABLE ADHESIVE COMPOSITION AND A LABEL CONTAINING IT

CROSS-REFERENCE TO RELATED APPLICATIONS

This application is a National Stage application of PCT/FI2019/050419, filed May 31, 2019 which is incorporated by reference herein in its entirety.

TECHNICAL FIELD

The present invention relates to a removable adhesive composition, and uses of the adhesive composition in different kinds of labels and label laminate applications. In addition, the present invention relates to a label and a label laminate containing the removable adhesive composition.

BACKGROUND

Generally, labels are used in different kinds of packing to provide identification and/or information about the contents of the packing or to decorate the packing, for example. The packing may be made of carton, glass or different kinds of polymers, such as thermoplastic polymers. Polyethylene terephthalate (PET) is an example of widely used thermoplastic polymers in containers like bottles. Presently, there is a growing interest of recycling and/or re-using packings made of glass, carton or polymers, for example. Thus, there is a need for easy removal of labels from the packing surfaces.

BRIEF DESCRIPTION OF THE INVENTION

The present invention is based on a finding that an adhesive composition comprising an acrylic dispersion and an amide wax provides excellent properties for attaching a label to a surface at room temperature and subsequent removal from the surface.

An object of the invention is to provide a removable adhesive composition comprising a polymer dispersion/emulsion, an amide wax and optionally a plasticizer and/or a tackifier. An object of the invention is to provide a label comprising a face layer and an adhesive layer, which comprises a removable adhesive composition comprising a polymer dispersion/emulsion, an amide wax and optionally a plasticizer and/or a tackifier. An object of the invention is to provide a label laminate comprising a face layer, an adhesive layer and a release liner, wherein the adhesive layer comprises the removable adhesive composition comprising a polymer dispersion/emulsion, an amide wax and optionally a plasticizer and/or a tackifier. Further, the invention relates to use of a removable adhesive composition comprising acrylic polymer dispersion/emulsion, an amide wax and optionally a plasticizer and/or a tackifier in labels and label laminates. The invention also relates to use of a removable adhesive composition comprising a polymer dispersion/emulsion, an amide wax and optionally a plasticizer and/or a tackifier as an adhesive layer of a label and/or a label laminate.

The objects of the invention are achieved by compositions and uses characterized by what is stated in the independent claims. The different embodiments of the invention are disclosed in the dependent claims.

DETAILED DESCRIPTION OF THE INVENTION

Figure 1:
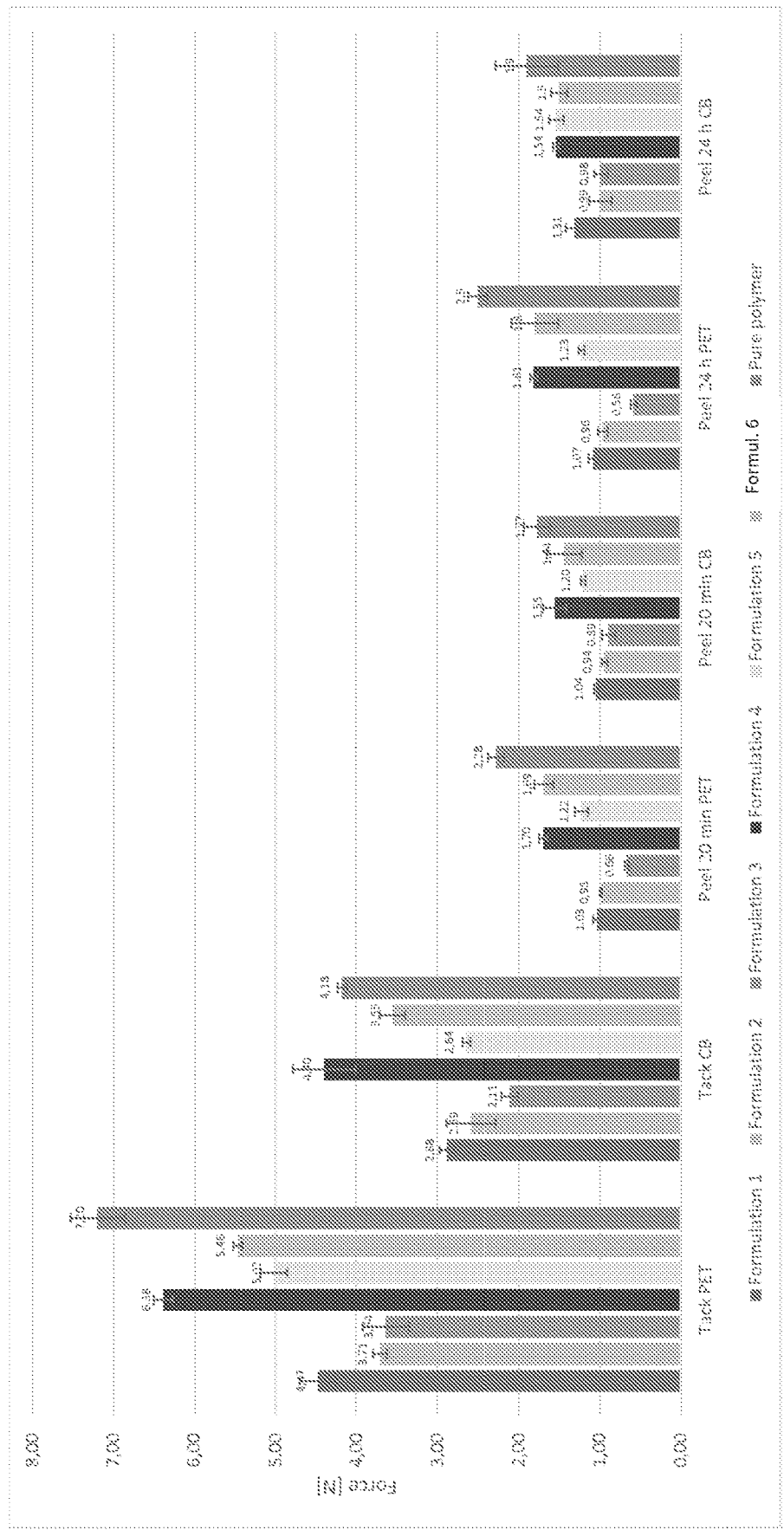
FIG. 1 shows the results received when testing the adhesive compositions of the invention according to FINAT standards (2014): FTM2 Peel adhesion (90°) and FTM9 Loop tack.

The present invention relates to a removable acrylic adhesive and uses of the adhesive in different kinds of labels and applications. The present invention relates in general to a removable adhesive composition comprising a water based polymer emulsion, an amide wax and optionally a plasticizer and/or a tackifier.

The present invention relates also to a label comprising a face layer and an adhesive layer, wherein the adhesive layer comprises a removable adhesive comprising a water based polymer emulsion, an amide wax and optionally a plasticizer. Further, the present invention relates also to a label laminate comprising a face layer, an adhesive layer and a release liner, wherein the adhesive layer comprises a removable adhesive comprising a water based polymer emulsion, an amide wax and optionally a plasticizer.

Acrylic polymers are characteristically tacky and can be used as pressure sensitive adhesives even without any modification. Typically, however, tackifiers are added to improve adhesion properties of the adhesive composition. Acrylic polymers have usually good aging and UV-resistance properties. Acrylic polymers are polar in nature, which gives good adhesion to polar substrates, such as glass and steel.

In this application term "removable adhesive" refers to a pressure sensitive adhesive (PSA), which is tacky at application temperature and can be applied with pressure onto a surface of an item and subsequently removed, i.e. peeled off from the surface. Ideally, the label comprising removable adhesive can be completely removed with no residue being left on the surface of the item from which the label is removed.

Term "label" refers to a piece of material carrying information and to be applied i.e. labelled onto a surface of an item. An adhesive label comprises a face layer and an adhesive layer. A label comprising an adhesive layer of pressure sensitive adhesive may be referred to as a pressure sensitive adhesive (PSA) label. Pressure sensitive adhesive labels may also be referred to as self-adhesive labels. The labels consisting of PSA can be adhered to most surfaces through an adhesive layer without the use of a secondary agent, such as a solvent, or heat to strengthen the bond. The PSA forms a bond when pressure is applied onto the label at ambient temperature (e.g. between 15 and 35° C.), adhering the label to the item to be labelled.

Term "face layer" refers to a top layer of the label. The face layer may comprise, for example, printing in order to provide information about the content of the labelled packing and/or visual effect thereto.

Term "label laminate" refers to a continuous label laminate structure from which the individual labels can be cut. The label laminate comprises a face layer, an adhesive layer, and further a release liner. The face layer and the release liner are typically laminated together having the pressure sensitive adhesive layer in between. Such laminated structure is referred to as a label laminate. The release liner is used to protect the adhesive layer. It also allows easier handling of the labels to up to the point of labelling where the individual labels are dispensed and adhered to a surface of an item. In labelling the release liner is removed and disposed of. Thus, the release liner of the label laminate serves one or more useful functions: it is used as a carrier sheet onto which the adhesive may be coated; it protects the adhesive layer during storage and transportation; it provides a support for labels during die-cutting and printing, and ultimately it releases from the adhesive leaving it undamaged.

Term "tack" refers to a holding power of an adhesive (adhesion) upon contact with the substrate. An adhesive with initial high tack will grab the substrate quickly. An adhesive with low initial tack will exhibit a low level of adhesion when applied. Tack can be measured by loop tack measurement according to FINAT Test Method No. 9 (FTM9, FINAT Technical Handbook 9th ed., 2014). The loop tack value of an adhesive is expressed as the force required to separate, at specific speed, a loop of material brought into contact with a specified area of a standard surface.

Term "peel force" refers to a measure of an adhesive's ability to wet out a surface and subsequently adhere to the substrate, i.e. quantify the permanence of the adhesion or peel ability of the adhesive, Peel adhesion is defined as the force required to remove adhesive coated material from a standard test plate after a certain dwell time at an angle of 90 degree or 180 degree and with specified speed. Peel adhesion may be measured according to FINAT Test Method No. 1 or No. 2 (FTM1 and FTM2, FINAT Technical Handbook 9th ed., 2014).

Acrylic Monomers and Acrylic Polymer

The acrylic polymer emulsion of the present invention comprises at least one C5 to C10 alkyl (meth)acrylate monomer, at least one monomer having at least one acid or acid anhydride group, and at least one acryl monomer having at least one amide group. The acrylic polymer of the present invention comprises optionally also at least one C1 to C4 alkyl (meth)acrylate monomer and/or at least one hydroxyalkyl (meth)acrylate monomer.

In one embodiment, the acrylic polymer of the present invention comprises a C5 to C10 alkyl (meth)acrylate monomer, a monomer having at least one acid or acid anhydride group, and an acryl monomer having at least one amide group. The acrylic polymer of the present invention comprises optionally also a C1 to C4 alkyl (meth)acrylate monomer and/or a hydroxyalkyl (meth)acrylate monomer. In one embodiment, the acrylic polymer of the present invention consists of at least one C5 to C10 alkyl (meth) acrylate monomer, at least one monomer having at least one acid or acid anhydride group, at least one acryl monomer having at least one amide group, and optionally at least one C1 to C4 alkyl (meth)acrylate monomer and/or at least one hydroxyalkyl (meth)acrylate monomer.

The C5 to C10 alkyl (meth)acrylate monomer can be selected from esters of prop-2-enoic acid or 2-methylprop-2-enoic acid with butan-1-ol, 2-methylpropan-1-ol, butan-2-ol, 2-methylpropan-2-ol, pentan-1-ol, 3-methylbutan-1-ol, 2,2-dimethylpropan-1-ol, hexano-1-ol, heptan-1-ol, octan-1-ol, 2-ethylhexan-1-ol, 6-methylheptan-1-ol, nonan-1-ol, 7-methyloctan-1-ol, dodecan-1-ol, 8-methylnonan-1-ol, undecane-1-ol or dodecan-1-ol. The C5 to C10 alkyl (meth) acrylate monomer can also be selected from aliphatic/alicyclic esters of prop-2-enoic acid or 2-methylprop-2-enoic acid with trideca-1-ol, tetradecan-1-ol, pentadecan-1-ol, hexaden-1-ol, octadecan-1-ol, cyclohexanol, (1S,2S,4S)-1,7,7-trimethylbicyclo[2.2.1]heptan-2-ol and the other isomers thereof. In one embodiment, the C5 to C10 alkyl (meth)acrylate monomer is 2-ethylhexyl prop-2-enoate (2-ethylhexyl acrylate, EHA).

The monomer having at least one acid or acid anhydride group can be selected from carboxylic group-containing monomers, such as prop-2-enoic acid and 2-methylprop-2-enoic acid, 2-methylidenebutanedioic acid, (2Z)-but-2-enedioic acid, (2Z)-but-2-enedioic acid, (2E)-but-2-enoic acid and/or anhydrides. The monomer having at least one acid or acid anhydride group can also be selected from vinyl monomers such as ethenylbenzene, isopropenylbenzene, ethenyl acetate and vinyl esters of neoalkanoic acids. In one embodiment, the monomer having at least one acid or acid anhydride group is prop-2-enoic acid (acrylic acid, AA).

The acryl monomer having at least one amide group can be selected from prop-2-enamide, 2-methylprop-2-enamide, 1-ethenylpyrrolidin-2-one, N,N-dimethylprop-2-enamide N,N,2-trimethylprop-2-enamide, N-(2-methyl-4-oxopentan-2-yl)prop-2-enamide in combination or without hexanedihydrazide or other dihydrazides, 2-(2-methylprop-2-enoyloxy)ethyl 3-oxobutanoate, N-(hydroxymethyl)prop-2-enamide and N-(hydroxymethyl)2-methylprop-2-enamide. In one embodiment, the acryl monomer having at least one amide group is prop-2-enamide (acryl amide, AM). In one embodiment, the acryl monomer having at least one amide group is N-(2-methyl-4-oxopentan-2-yl)prop-2-enamide (diacetone acrylamide, DAAM).

The C1 to C4 alkyl (meth)acrylate monomer can be selected from esters of prop-2-enoic acid and 2-methylprop-2-enoic acid with methanol, ethanol, propan-1-ol or propan-2-ol. In one embodiment, the C1 to C4 alkyl (meth)acrylate monomer is butyl prop-2-enoic acid (BA). In one embodiment, the C1 to C4 alkyl (meth)acrylate monomer is methyl 2-methylprop-2-enoate (MMA).

The hydroxyalkyl (meth)acrylate monomer can be selected from 2-hydroxyethyl 2-methylprop-2-enoate (HEMA), 2-hydroxyethyl prop-2-enoate, 3-hydroxypropyl prop-2-enoate and isomers, 3-hydroxypropyl 2-methylprop-2-enoate and isomers, 4-hydroxybutyl prop-2-enoate and isomers, 4-hydroxybutyl 2-methylprop-2-enoate and isomers, and higher homologues. In one embodiment, the hydroxyalkyl(meth)acrylate monomer is 2-hydroxyethyl 2-methylprop-2-enoate (HEMA).

In one embodiment, the acrylic polymer comprises 70% to 99% by weight of a C5 to C10 alkyl (meth)acrylate, 0.5% to 15% by weight of a monomer having at least one acid or acid anhydride group, 0.5% to 15% by weight of a monomer having at least one amide group, 0% to 20% by weight of a C1 to C4 alkyl (meth)acrylate and 0% to 5% by weight of a hydroxyalkyl (meth)acrylate.

In one embodiment, the acrylic polymer comprises 70% to 99% by weight of a C5 to C10 alkyl (meth)acrylate, 0.5% to 15% by weight of a monomer having at least one acid or acid anhydride group, 0.5% to 15% by weight of a monomer having at least one amide group, and 0% to 20% by weight of a C1 to C4 alkyl (meth)acrylate.

In one embodiment, the acrylic polymer comprises 70% to 99% by weight of a C5 to C10 alkyl (meth)acrylate, 0.5% to 15% by weight of a monomer having at least one acid or acid anhydride group and 0.5% to 15% by weight of a monomer having at least one amide group and 0% to 5% by weight of a hydroxyalkyl (meth)acrylate.

In one embodiment, the acrylic polymer comprises 70% to 99% by weight of a C5 to C10 alkyl (meth)acrylate, 0.5% to 15% by weight of a monomer having at least one acid or acid anhydride group and 0.5% to 15% by weight of a monomer having at least one amide group.

In one embodiment, the acrylic polymer comprises 2-ethylhexyl acrylate (EHA). In one embodiment, the acrylic polymer comprises acrylic acid (AA). In one embodiment, the acrylic polymer comprises acryl amide (AM). In one embodiment, the acrylic polymer comprises butyl acrylate (BA). In one embodiment, the acrylic polymer comprises diacetone acrylamide (DAAM). In one embodiment, the acrylic polymer comprises methyl methacrylate (MMA). In one embodiment, the acrylic polymer comprises hydroxyethyl methacrylate (HEMA). In one embodiment, the acrylic polymer comprises 2-ethylhexyl acrylate (EHA), acrylic acid (AA), and acryl amide (AM) and/or diacetone acrylamide (DAAM) and optionally butyl acrylate (BA), methyl methacrylate (MMA) and/or hydroxyethyl methacrylate (HEMA).

The C5 to C10 alkyl (meth)acrylate monomers, especially 2-ethylhexyl acrylate (EHA), form low glass transition (Tg) polymers. The polymers are characterized by low storage modulus (G') that promotes good flow of the polymer onto substrate including rough substrates like cardboard, exhibited as high tack.

The monomers having at least one acid or acid anhydride group, such as acrylic acid (AA), and the acrylic monomers having at least one amide group, such as acryl amide (AM), interact with each other. The monomer having at least one acid or acid anhydride group, especially acrylic acid, also provides stability to the dispersion. The acrylic monomer having at least one amide group, especially acryl amide forms strong hydrogen bonds with other proton donors such as hydroxyl and carboxyl groups. The acrylic monomer having at least one amide group, such as acryl amide, is used to reduce mobility of polymer chains, i.e., reduce the dissipation by lowering loss modulus (G"). It thus improves removability and helps achieving long-term removability. Acrylic monomers having at least one amide group, especially diacetone acrylamide (DAAM) promotes adhesion to cardboard (CB) as well as to polar substrates such as PET.

Addition of the C1 to C4 alkyl (meth)acrylate monomers, such as butyl acrylate (BA) methyl methacrylate (MMA) and/or hydroxyethyl methacrylate (HEMA) modifies the polarity of the polymer and promote adhesion to polar substrates like PET and glass.

In one embodiment, the acrylic polymer emulsion is obtained from acrylic monomers selected from acrylic acid (AA), acryl amide (AM), diacetone acrylamide (DAAM), butyl acrylate (BA), methyl methacrylate (MMA), hydroxyethyl methacrylate (HEMA) and 2-ethylhexyl acrylate (EHA). In one embodiment, the acrylic polymer is obtained from acrylic monomers selected from acrylic acid (AA), acryl amide (AM), butyl acrylate (BA) and 2-ethylhexyl acrylate (EHA). In one embodiment, the amount of EHA is in the range of 70 to 99% based on the dry weight of the monomers. In one embodiment, the amount of AA is in the range of 0.5% to 5% based on the dry weight of the monomers. In one embodiment, the amount of AM is in the range of 0.5% to 5% based on the dry weight of the monomers. In one embodiment, the amount of DAAM is in the range of 0.5% to 5% based on the dry weight of the monomers. In one embodiment, the amount of BA is in the range of 0% to 20% based on the dry weight of the monomers. In one embodiment, the amount of MMA is in the range of 0% to 20% based on the dry weight of the monomers. In one embodiment, the amount of HEMA is in the range of 0% to 20% based on the dry weight of the monomers. In one embodiment, the amount of EHA is about 85% based on the dry weight of the monomers. In one embodiment, the amount of EHA is about 90.5% based on the dry weight of the monomers. In one embodiment, the amount of AA is about 1.0% based on the dry weight of the monomers. In one embodiment, the amount of AM is about 1.0% based on the dry weight of the monomers. In one embodiment, the amount of BA is about 13% based on the dry weight of the monomers. In one embodiment, the amount of MMA is about 6% based on the dry weight of the monomers. In one embodiment, the amount of HEMA is about 1.5% based on the dry weight of the monomers. Acrylic monomers are commercially available from several suppliers.

During polymerization stage also crosslinking monomers and/or monomers improving stability of particles can be used to provide desired specific properties to the polymer dispersion/emulsion and the polymer itself. Suitable crosslinking monomers are diesters of prop-2-enoic acid and 2-methylprop-2-enoic acid with diols such as ethane-1,2-diol, propane-1,2-diol, propane-1,3-diol, butane-1,3-diol, butane-1,4-diol, and also 1,2-bis(ethenyl)benzene, ethenyl 2-methylprop-2-enoate, prop-2-enyl 2-methylprop-2-enoate, prop-2-enyl prop-2-enoate, bis(prop-2-enyl) (Z)-but-2-enedioate, bis(prop-2-enyl) (E)-but-2-enedioate, N-[(prop-2-enoylamino)methyl]prop-2-enamide. Suitable monomers improving stability of particles are ethenesulfonic acid, 2-methyl-2-(prop-2-enoylamino)propane-1-sulfonic acid, 4-ethenylbenzenesulfonic acid and their water-soluble salts.

During polymerization highly crosslinked polymer, having high amount of insoluble fraction (gel), is formed. In one embodiment, the insoluble fraction of the crosslinked polymer is at least 60% based on the weight of the polymer. In one embodiment, the insoluble fraction is over 60% based on the weight of the polymer. In one embodiment, the insoluble fraction of the polymer is at least 70% based on the weight of the polymer. In one embodiment, the insoluble fraction of the polymer is over 70% based on the weight of the polymer. In one embodiment, the insoluble fraction of the polymer is over 80% or over 90% based on the weight of the polymer. In one embodiment, the insoluble fraction of the crosslinked polymer is in the range of 60-90%, 60-80% or 60-70% based on the weight of the polymer. In one embodiment, the insoluble fraction of the polymer is 100% based on the weight of the polymer. The high level of gel i.e. insoluble fraction of the cross-linked polymer additionally decreases G" and improves removability.

In the preparation of the polymer emulsion/dispersion, any type of process, such as emulsion polymerisation, miniemulsion or any type of free radical polymerisation can be utilized. The process can be batch, semi-batch or continuous. Further, any kind of a water soluble initiator, an oil soluble initiator, persulfates, peroxides, thermal initiators or redox initiators, for example, can be used. It belongs to the knowledge of a person skilled in the art to select the suitable type of process for preparing the acrylic polymer emulsion and additives required thereto. In one embodiment, the acrylic emulsion is prepared in a semi-continuous process using a water soluble initiator. In one embodiment, the initiator is ammonium persulfate. In one embodiment, the acrylic emulsion is prepared by emulsion polymerization.

Emulsifiers

In one embodiment, the acrylic emulsion is stabilized by using at least one emulsifier. In one embodiment, emulsifier is used in an amount of 0-2% based on the dry weight of the acrylic emulsion. In one embodiment, emulsifier is used in an amount of about 1% based on the dry weight of the acrylic emulsion. In one embodiment, the emulsifier is selected from alkyl aryl sulfonates such as sodium:2-dodecylbenzenesulfonate, alkyl sulfates such as sodium; dodecyl sulfate, ammonium dodecyl sulfate, sulfates of ethoxylated alcohols such as laureth sulfate, sulfates and sulfonates of ethoxylated alkylphenols, sulfosuccinates, diphenyl sulfonates, phosphates of ethoxylated fatty alcohols and non-ionic ethoxylated alcohols, ethoxylated alkylphenols, (polyoxyethylene-polyoxypropylene) block polymers. The emulsifier may be used alone or they can used in combination. Additionally reactive emulsifiers, which copolymerize with monomers during polymerization but provide stability might be used as well.

Any other types of emulsifiers and their blends known to a person skilled in the art might be used as stabilizers. Additionally, commercially available protective colloids such as polyvinyl alcohols, modified starch and ethers of cellulose might be also used as stabilizers.

In one embodiment, the emulsifier is selected from ammonium salt of ethoxylated fatty alcohol phosphate, sodium salt of ethoxylated fatty alcohol sulfate and/or sodium salt of dioctyl sulfosuccinate. In one embodiment, the emulsifier is a blend of ammonium salt of ethoxylated fatty alcohol phosphate, sodium salt of ethoxylated fatty alcohol sulfate and/or sodium salt of dioctyl sulfosuccinate. Ammonium salt of ethoxylated fatty alcohol phosphate provides excellent stability of the dispersion as well as promotes removability by fast migration to the adhesive surface. Sodium salt of ethoxylated fatty alcohol sulfate has a long oxyethylene chain and increases polarity of the film and promotes adhesion to polar substrates. Sodium salt of dioctyl sulfosuccinate acts as a wetting agent and allows to reduce the amount of post-added wetting agent. Emulsifiers are typically commercially available from several suppliers.

In one embodiment, the acrylic emulsion may optionally be subjected to a post-treatment using additional processing aids, such as tert-butyl hydroperoxide, formaldehyde sodium sulfoxylate and/or ammonia.

In one embodiment, the acrylic emulsion/disperison may optionally contain additives, such as preservatives, for example.

Amide Wax

The removable acrylic adhesive of the present invention comprises at least one amide wax. In one embodiment of the invention, the amide wax has a softening/melting/dropping point in the range of about 85° C.-about 151° C. In one embodiment of the invention, the amide wax has a softening/melting/dropping point in the range of about 85° C.-about 142° C. In one embodiment, the amide wax has a softening/melting/dropping point in the range of about 100° C.-about 142° C. In one embodiment, the softening/melting/dropping point is in the range of about 120° C.-about 151° C. High melting temperature ensures stability during coating and/or drying processes as well as long-term stability in variety of environmental conditions.

In one embodiment, the amide wax has particle size distribution (D98) in the range of 0.5-20 µm. In one embodiment of the invention, the particle size distribution (D98) varies from <8 µm to 18 µm. In one embodiment of the invention, the particle size distribution varies from about 1 µm to about 10 µm. In one embodiment of the invention, the particle size distribution varies from about 1 µm to about 17 µm. In one embodiment of the invention, the particle size distribution varies from about 8 µm to about 15 µm. The particle size distribution in range of 0.5-20 µm improves the removability by reducing adhesive's contact surface with substrates. Due to the polar amide domains, the amide waxes aid adhesion to paper face materials and as a result promote anchorage. Amide particles may also have effect on removability by providing physical hindrance between the adhesive layer and the surface attached. In other words, the particles may provide contact hindrance for the adhesive and thus enable reducing the contact surface of the adhesive layer with the labelled surface and enhance the subsequent removability.

Suitable amide waxes are ethylene-bis-stearamide (EBS) waxes, erucamice waxes, oleamide waxes, stearamide waxes and mixtures thereof, for example. In addition, primary amides such as octadecanamide, docosanamide, (Z)-octadec-9-enamide, (Z)-docos-13-enamide, and the like; secondary amides such as (Z)-N-octadecyldocos-13-enamide, N-docos-13-enyldocos-13-enamide, N-octadec-9-enyl-hexadecanamide, N-octadecyloctadecanamide, N-[(E)-docos-13-enyl]octadecanamide, and the like; ethylene bisamides such as, N-[2-(octadecanoylamino)ethyl]octadecanamide, N,N-ethylenebisolamide and similar also be utilized. The above amides can also be used in any combination. Suitable amide waxes include also modified amide waxes, such as an ester wax modified ethylene-bis-stearamide. Carnauba wax, candelilla wax and beeswax are the main commercial components of wax esters. Reduction of particle size of the wax (micronisation) can be done by pearl grinding or by melting and quickly cooling the wax to spherical droplets. The method of micronising affects to the shape of the particles. Micronising with melting may give more spherical shape compared to grinding.

The amide wax can be used in the form of powder or dispersion in the present invention.

In one embodiment, the amide wax is ethylene-bis-stearamide (EBS, N,N'-ethylene bis-stearamide, N-[2-(octadecanoylamino)ethyl]octadecanamide). EBS has a high melting temperature (over 140° C.) which ensures stability during coating and/or drying processes as well as long-term stability in variety of environmental conditions. In one embodiment, EBS has particle size distribution (D98) in the range of 0.5-20 µm. In one embodiment, the particle size distribution (D98) varies from <8 µm to 18 µm. In one embodiment, the particle size distribution varies from about 1 µm to about 10 µm. In one embodiment, the particle size distribution varies from about 1 µm to about 17 µm. In one embodiment of the invention, the particle size distribution varies from about 8 µm to about 15 µm. The particle size distribution in range of 0.5-20 µm improves the removability by reducing adhesive's contact surface with substrates. EBS is non-toxic and it can be used in applications requiring food contact certification. Due to its polar amide domains it aids adhesion to paper face materials and as a result promotes anchorage. In one embodiment, EBS is in the form of dispersion. EBS is commercially available from several suppliers.

In one embodiment, the amide wax is a modified ethylene-bis-stearamide wax. Modified ethylene-bis-stearamide waxes have a high melting temperature (in the range of about 85° C.-142° C.) which ensures stability during coating and/or drying processes as well as long-term stability in variety of environmental conditions. In one embodiment, the modified EBS has particle size distribution (D98) in the range of 0.5-20 µm. In one embodiment, the particle size distribution (D98) varies from <8 μm to 18 μm. In one embodiment, the particle size distribution varies from about 1 μm to about 10 μm. In one embodiment, the particle size distribution varies from about 1 μm to about 17 μm. In one embodiment of the invention, the particle size distribution varies from about 8 μm to about 15 μm. The particle size distribution in the range of 0.5-20 μm improves the removability by reducing adhesive's contact surface with substrates Modified ethylene-bis-stearamide waxes are commercially available.

Plasticizer

Plasticizers may affect the viscoelastic properties of final adhesive by reducing storage and loss modulus at the same time with reduction of glass transition temperature. This softens the adhesive and improves removability. Plasticizers are commercially available from several suppliers.

In one embodiment, the removable adhesive comprises a plasticizer.

In one embodiment, the plasticizer is composed of diethylene glycol dibenzoate (2-(2-benzoyloxyethoxy)ethyl benzoate,) dipropylene glycol dibenzoate ( ), 1-(2-benzoyloxypropoxy)propan-2-yl benzoate) and triethylene dibenzoate (2-[2-(2-benzoyloxyethoxy)ethoxy]ethyl benzoate.) Also other plasticisers like adipates, benzoates and, terephalates can be used. Examples of adipate ester plasticisers are bis(2-ethylhexyl) adipate (DEHA), dioctyl adipate (DOA), dimethyl adipate (DMAD). Examples of suitable terephthalates are dioctyl terephthalate (DOTP, di-2-ethylhexyl terephthalate, DEHT) and di-isobutyl terephthalate (DBT).

Examples of other useful plasticizers include dibutyl benzene-1,2-dicarboxylate (DBP), dioctyl benzene-1,2-dicarboxylate (DOP), bis(7-methyloctyl) benzene-1,2-dicarboxylate (DINP), bis(8-methylnonyl) benzene-1,2-dicarboxylate (DIDP), dioctyl (Z)-but-2-enedioate (DOM), 2-O-benzyl 1-O-butyl benzene-1,2-dicarboxylate (BBP), trioctyl benzene-1,2,4-tricarboxylate (TOTM), tris(7-methyloctyl) benzene-1,2,4-tricarboxylate (TINTM), tris(8-methylnonyl) benzene-1,2,4-tricarboxylate (TIDTM), tris(2-methylphenyl) phosphate (TCP), trioctyl phosphate (TOP), (2-methylphenyl) diphenyl phosphate (CDP), dioctyl hexanedioate (DOA), bis(7-methyloctyl) hexanedioate (DINA), bis(8-methylnonyl) hexanedioate (DIDA), triethyl 2-hydroxypropane-1,2,3-tricarboxylate (TEC), tributyl 2-hydroxypropane-1,2,3-tricarboxylate (TBC), acetyl triethyl citrate (ATEC), acetyl tributyl citrate (ATBC), triethyl 2-acetyloxypropane-1,2,3-tricarboxylate (TOC), trihexyl 2-acetyloxypropane-1,2,3-tricarboxylate (ATHC), and trimethyl 2-hydroxypropane-1,2,3-tricarboxylate (TMC). Additionally polymeric plasticizers which include the ester reaction products of diacids such as decanedioic acid, pentanedioic acid, nonanedioic acid and hexanedioic acid with glycols such as propane-1,2-diol, propane-1,3-diol, butane-1,3-diol, butane-1,4-diol, 2,2,4-trimethylpentane-1,3-diol, polyethylene and polypropylene glycols, can be utilized. In one embodiment, the plasticiser is di-2-ethylhexyl terephthalate (DEHT, DOTP, 1,4-benzenedicarboxylic acid bis(2-ethylhexyl)ester), which is a non-phthalate plasticizer.

Tackifier

In order to enhance the initial adhesion, a tackifier resin can added to the composition. Tackifiers can be used to adjust adhesion/cohesion balance. However, the addition of a tackifier shall be very fine in order to keep removability as smooth as possible. Suitable tackifier dispersion types to be used in the present invention, are rosin acid, rosin ester, terpene resin, hydrocarbon resin based dispersions or their hybrid dispersion. Hybrid tackifier dispersion is a combination of hydrocarbon resin and rosin acid or ester. A person skilled in the art selects the tackifier based on its compatibility with polymer, stability, odour, colour, softening point, acid number and particle size. In one embodiment, the tackifier is a rosin acid, polyterpene resin, terpene-phenol resin, styrene terpene resins, rosin ester, hydrogenated rosin resin, dimerised rosin resin or hydrocarbon resin or any blend thereof. Tackifiers are commercially available from several manufactures, such as, DRT (France), Eastman (USA), Lawter BVBA (Belgium) and Kraton Corporation (USA).

Adhesive Composition

In one embodiment, the removable adhesive composition of the present invention comprises a water based acrylic emulsion in an amount of 78.0-98.0%, 83.0-98.0%, 85.0-98.0% or 88.0-98.0% or 92.0-98.0% based on the dry weight of the adhesive composition. In one embodiment, the removable adhesive composition of the present invention comprises an amide wax in an amount of 2.0-22.0%, 2.0-17.0%, 2.0-12.0% or 2.0-8.0% based on the dry weight of the adhesive composition. In one embodiment, the removable adhesive composition of the present invention comprises a plasticizer in an amount of 0-10.0%, 0-5.0%, 0-3.5%, 0-3.0% or 0-2.5% based on the dry weight of the adhesive composition. In one embodiment, the removable adhesive composition of the present invention comprises a tackifier in an amount of 0-15.0%, or 0-11.0% or 0-9.5% based on the dry weight of the adhesive composition. In one embodiment, the removable adhesive composition of the present invention comprises a water based acrylic polymer in an amount of 78.0-98.0%, 83.0-98.0%, 85.0-98.0%, 88.0-98.0% or 92.0-98.0%, an amide wax in an amount of 2.0-22.0%, 2.0-17.0%, 2.0-15.0%, 2.0-12.0% or 2.0-8.0%, a plasticizer in an amount of 0-10.0%, 0-5.0%, 0-3.5%, 0-3% or 0-2.5%, and a tackifier in an amount of 0-15.0%, or 0-11.0% or 0-9.5%, based on the dry weight of the adhesive composition.

In one embodiment, the removable adhesive composition comprises a water based acrylic polymer in an amount of 83.0-98.0% based on the dry weight of the adhesive composition, an amide wax in an amount of 2.0-17.0% based on the dry weight of the adhesive composition, a plasticizer in an amount of 0-10.0% based on the dry weight of the adhesive composition and a tackifier in an amount of 0-15.0% based on the dry weight of the adhesive composition. In one embodiment, the removable adhesive composition of the present invention comprises a water based acrylic polymer emulsion in an amount of 90-98% based on the dry weight of the adhesive composition, an amide wax in an amount of 2-10% based on the dry weight of the adhesive composition, and a plasticizer in an amount of 0-3% based on the dry weight of the adhesive composition.

The adhesive composition can also contain small amounts of processing additives, such as a wetting agent and/or a thickener, for example. The amounts of these additives are typically in the range of 0.2-1.0% based on the dry weight of the composition. In one embodiment of the invention, the adhesive composition comprises a wetting agent in an amount of 0.5% based on the dry weight of the composition.

Differential scanning calorimetry analysis of the adhesive compositions according to the invention revealed that the characteristic melting peaks of the amide wax can be observed on thermograms indicating that the wax does not mix with the polymer in molten state and recovers via recrystallization during cooling stage. The amide wax is thus stable and incompatible in the compositions.

An important aspect of a removable adhesive composition is that the composition gains strength via dissipation. In other words, when a sufficient pulling force is applied, the adhesive composition begins to fail cohesively, such that energy that would otherwise pull the composition apart at the interface is absorbed by the composition. The rheological properties of the composition may further be described by the storage modulus G' and loss modulus G". Storage modulus, denoted as G', measures the stored energy within the composition. Storage modulus thus represents the elastic portion. Loss modulus, denoted as G", measures the energy dissipated as heat. Loss modulus represents the viscous portion. In a situation above the glass transition temperature, where G' is larger than G", the composition has capacity to store energy and may return to its initial configuration, when a mechanical force is applied on the material. The composition thus has elastic behaviour. In a situation where G" is larger than G', a mechanical force applied on the composition causes the internal structure of the composition to collapse, such that the composition flows. The viscoelastic properties of a removable adhesive composition may be determined by dynamic mechanical analysis, referred to as DMA.

Figure 3:
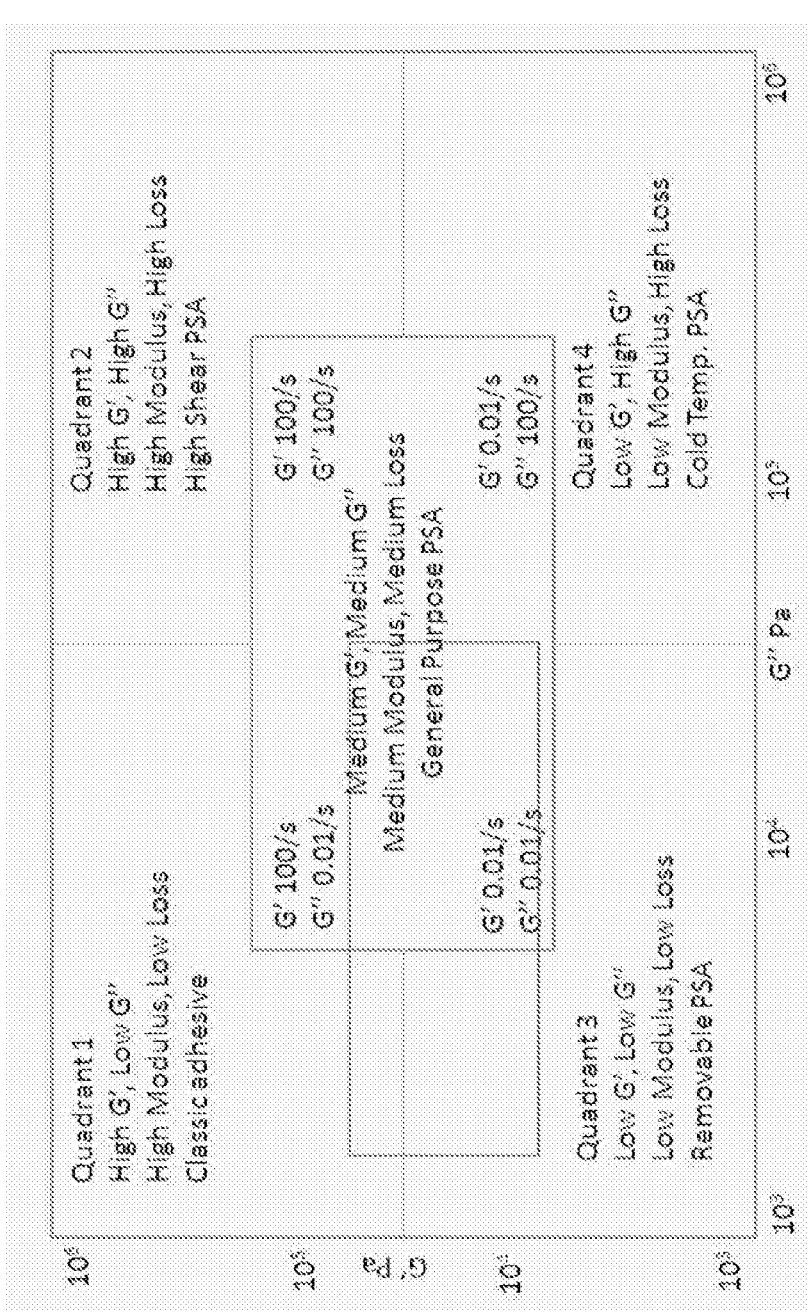
FIG. 3 shows the Chang window for acrylic polymer containing EHA, AA, AM and BA (latex 1).
Figure 4:
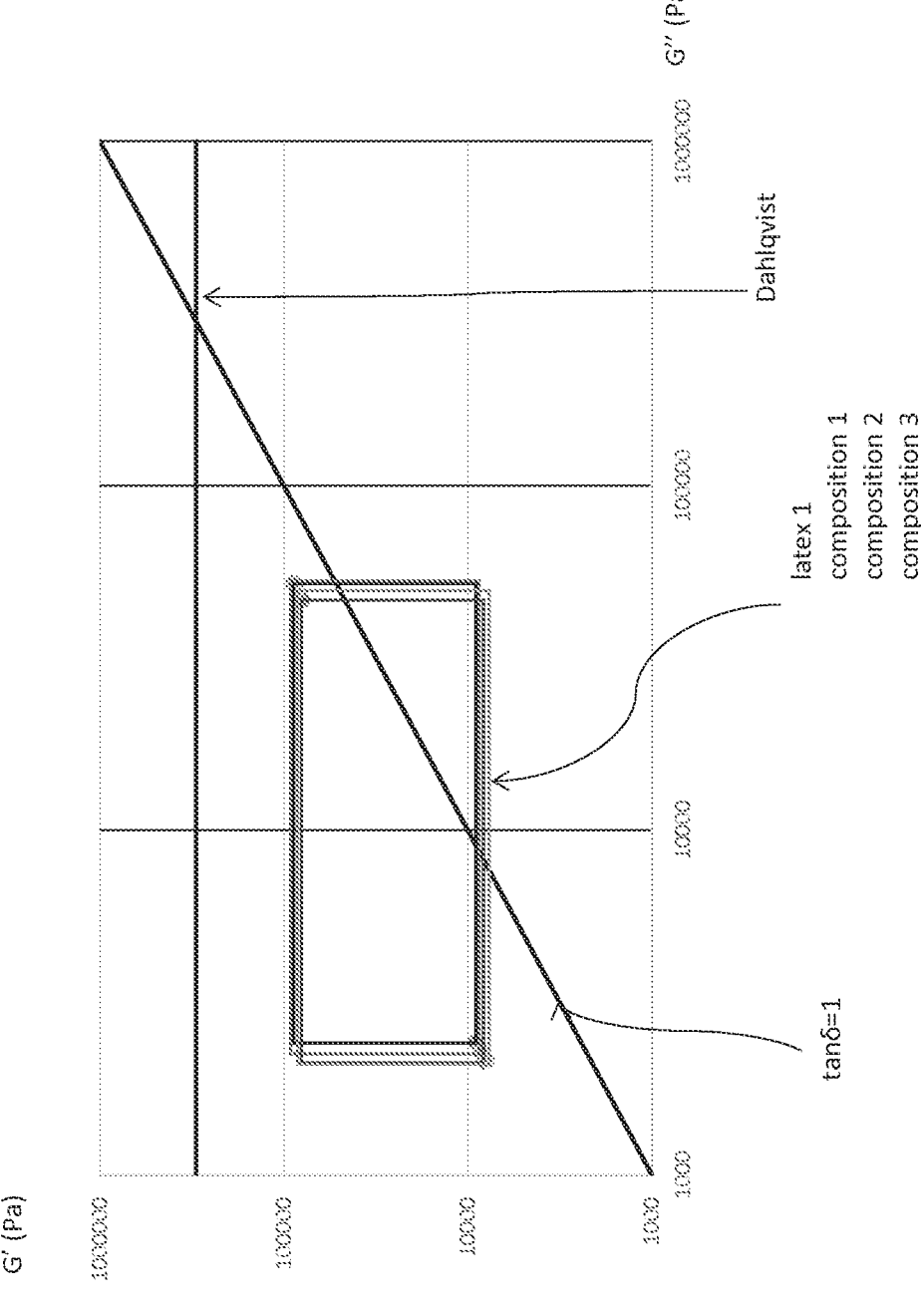
FIG. 4 shows the Chang windows for latex 1 and removable adhesive compositions 1, 2 and 3.
Figure 5:
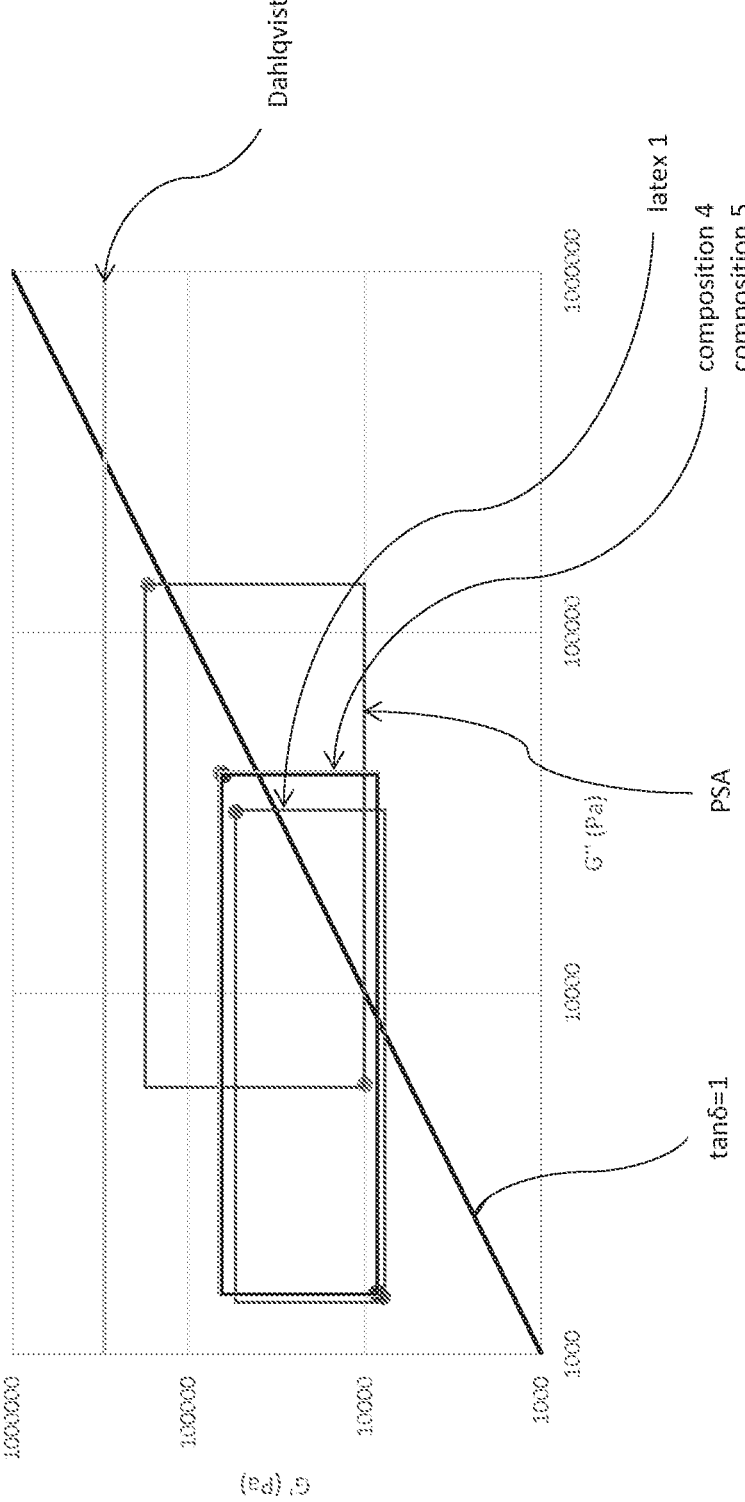
FIG. 5 shows the Chang windows for latex 1, a general purpose adhesive and removable adhesive compositions according to the invention.

The 'Chang window' (Chang, E. P. "Viscoelastic Properties of Pressure Sensitive Adhesives", The Journal of Adhesion, 1997, Vol. 60, pp. 233-248 and Chang, E. P., The Journal of Adhesion, Vol. 34, 1991, issue 1-4, pages 189-200) is a quadrant-based viscoelastic window, which may be used for evaluating the properties of a removable adhesive composition. The Chang window enables a construction of a cross-plot from the values of storage modulus G' and loss modulus G" on logarithmic scales at frequencies in the range of 0.01 to 100 radians per second (rad/sec), which correspond and cover typical time scales used for testing removable adhesive performance. The location of the formed cross-plot at the Chang window may be used to evaluate the characteristics of the tested adhesive composition. The lower the height of the sample in the Chang window is the higher is the shear resistance. Location of the Chang window therefore indicates what type of adhesive properties the composition possesses. In FIGS. 3, 4 and 5, the viscoelastic properties of the acrylic polymer (latex 1) and adhesive compositions according to the invention as well as a general purpose adhesive are illustrated by way of Chang windows. The horizontal axis represents the loss modulus G" in units of Pascal. The vertical axis represents the storage modulus G' in units of Pascal. Both the axes have been drawn in logarithmic scale. The diagonal line in FIGS. 4 and 5 represents the loss factor tan δ, which refers to the ratio of the loss modulus G" to the storage modulus G'. As can be observed from FIGS. 4 and 5, the adhesive compositions according to the invention have low to medium storage modulus G' values and low to medium loss modulus G" values. The adhesive compositions of the invention demonstrate thus the properties required from a removable pressure sensitive adhesive by the criteria of Chang.

The viscoelastic properties of the adhesive compositions may be further characterized with temperature sweep. A temperature sweep may be used to determine a number of characteristics of a removable adhesive composition, such as glass transition temperature Tg, wet ability, adhesion potential, elasticity or cohesion. In an oscillation temperature sweep, the deformation amplitude and the frequency are kept constant. In temperature sweep, the loss modulus G" and the storage modulus G', in units of Pascal (Pa), are plotted against the varied parameter, temperature, in units of Celsius grade (° C.). The loss factor tan δ is the ratio of the loss modulus G" to the storage modulus G', in other words, tan δ=G"/G'. The loss factor, tan δ, indicates the adhesion potential of the adhesive composition.

The adhesive composition exhibiting high polymer gel content and/or high molecular weight, good converting of the labels including printing, die-cutting and waste matrix stripping is achieved.

In one embodiment, the adhesive composition exhibits G' below 40 000 Pa at 100 rad/s at 25° C. In one embodiment, the adhesive composition exhibits G' below 35 000 Pa at 100 rad/s at 25° C. In one embodiment, the adhesive composition exhibits G' in the range of 20 000-40 000 Pa at 100 rad/s at 25° C. In one embodiment, the adhesive composition exhibits G" below 20 000 Pa at 100 rad/s at 25° C. In one embodiment, the adhesive composition exhibits G" below 17 000 Pa at 100 rad/s at 25° C. In one embodiment, the adhesive composition exhibits G" in the range of 10 000-20 000 Pa at 100 rad/s at 25° C.

In one embodiment, the adhesive composition has the loss factor, tan δ below 0.7 at 100 rad/s at 25° C. In one embodiment, the adhesive composition has the loss factor, tan δ in the range of 0.3-0.7 at 100 rad/s at 25° C. In one embodiment, the adhesive composition has the loss factor, tan δ, in the range of 0.4-0.6 at 25° C. In one embodiment, the adhesive composition has tan δ above 0.5 at 100 rad/s at 25° C.

The adhesive composition of the invention provides stable neat removability even over a prolonged period of time. The peel adhesion depends on several factors, such as, the substrate material (cardboard, glass, PET, PP, for example), the face material (top-coated paper, non-coated paper, for example) and coat weight. In one embodiment, the adhesive composition has 90° peel on PET below 7 N, below 6 N, below 5 N, below 4 N, below 3 N or below 2 N with a coated paper when measured according to FINAT standard FTM2 Peel adhesion (90°) In one embodiment, the adhesive composition has 90° peel on PET in the range of 1-7 N with a coated paper when measured according to FINAT standard FTM2 Peel adhesion (90°). In one embodiment, the adhesive composition has 90° peel on PET in the range of 1-4.5 N with a coated paper. In one embodiment, the adhesive composition exhibits tack in the below 7 N, below 6 N, below 5 N, below 4N, below 3 N or below 2 N with a coated paper, when measured according to FINAT standard (2014) FTM9 Loop Tack. In one embodiment, the adhesive composition exhibits tack in the range of 1-7 N with a coated paper, when measured according to FINAT standard (2014) FTM9 Loop Tack.

In one embodiment, the adhesive composition exhibits glass transition temperature (Tg) below −30° C. In one embodiment, the adhesive composition has the glass transition temperature (Tg) between −50° C. and −30° C. In one embodiment, the adhesive composition has the glass transition temperature (Tg) between −50° C. and −40° C. These glass transition temperature (Tg) values are determined with Dynamic Mechanical Analysis (DMA) by means of a temperature sweep. The actual conditions are disclosed in example 10.

In one embodiment, the adhesive composition exhibits glass transition temperature (Tg) below −55° C. In one embodiment, the adhesive composition has the glass transition temperature (Tg) between −75° C. and −55° C. In one embodiment, the adhesive composition has the glass transition temperature (Tg) between −70° C. and −60° C. These glass transition temperature (Tg) values are determined with Differential Scanning Calorimetry (DSC) analysis according to standard ISO 11357-2 with the exception of using heating rate 10° C./min.

The adhesive composition of the present invention can be produced at low cost using acrylic monomers, which are widely available. The adhesive composition can be used with variety of paper face materials. The adhesive composition can be used with plastic face materials, such as polyolefins. In one embodiment, a primer is not required in order to provide excellent anchorage to the label. In one embodiment, the adhesive composition comprises no migrating components. In one embodiment, the adhesive composition complies with food regulations.

The adhesive composition of the invention can be used as an adhesive layer of a label and/or a label laminate.

A label structure comprises a face layer. One surface of the face layer includes the adhesive composition through which, the label is adhered to the surface of an item during labelling.

The face layer may comprise printing in order to provide information and/or visual effect, such as information of the content of the item labelled. Printable face film is suitable for printing by any of the known printing methods, such as with gravure, flexographic process, offset, screen or letterpress or digital printing. Thermal printable face films or papers are suitable for printing by use of direct thermal printing (i.e. a digital printing process which produces a printed image by selectively heating coated thermal paper (or a synthetic paper/film) as it is commonly known, when the paper passes over the thermal print head, or thermal transfer printing (i.e. a printing method in which material is applied to paper (or some other material) by melting a coating of ribbon so that it stays glued to the material on which the print is applied.

According to an embodiment, the face layer is paper based. In one embodiment, there is no need of using separate primer to anchor the adhesive to the face layer with the adhesive composition of the present invention. Polar amide domains of the adhesive have effect on providing adhesion towards a paper face, which results enhanced anchorage of the adhesive layer. Enhanced anchorage towards the paper face minimizes the chance of adhesive remaining onto the labelled surface during removal of the label. In one embodiment, the adhesive composition of the invention has essentially no or no migrating components, thus it is possible to use different grades of paper face materials In one embodiment, the present invention relates to a label comprising a face layer and an adhesive layer, which comprises the adhesive composition comprising an acrylic polymer emulsion, an amide wax and optionally a plasticizer and/or a tackifier. In one embodiment, the label comprises a face layer and an adhesive layer, which comprises the removable adhesive composition comprising a water based acrylic polymer in an amount of 78.0-98.0%, 83.0-98.0%, 85.0-98.0%, 88.0-98.0% or 92.0-98.0%, an amide wax in an amount of 2.0-22.0%, 2.0-17.0%, 2.0-15.0%, 2.0-12.0% or 2.0-8.0%, a plasticizer in an amount of 0-10.0%, 0-5.0%, 0-3.5%, 0.30% or 0-2.5%, and a tackifier in an amount of 0-15.0% or 0-11.0% or 0-9.5%, based on the dry weight of the adhesive composition.

In one embodiment, the present invention relates also to a label laminate comprising a face layer, an adhesive layer and a release liner, wherein, the adhesive layer comprises an adhesive composition comprising an acrylic emulsion, an amide wax and optionally a plasticizer and/or a tackifier. In one embodiment, the label laminate comprises a face layer and an adhesive layer and a release liner, wherein the adhesive layer comprises the removable adhesive composition comprising a water based acrylic polymer in an amount of 78.0-98.0%, 83.0-98.0%, 85.0-98.0%, 88.0-98.0% or 92.0-98.0%, an amide wax in an amount of 2.0-22.0%, 2.0-17.0%, 2.0-15.0%, 2.0-12.0% or 2.0-8.0%, a plasticizer in an amount of 0-10.0%, 0-5.0%, 0-3.5%, 0.30% or 0-2.5%, and a tackifier in an amount of 0-15.0%, or 0-11.0% or 0-9.5%, based on the dry weight of the adhesive composition.

Labels can be attached to a wide variety of surfaces such as paper, cardboard, plastic, glass or metal, for example. It is desirable that the labels are removable to allow the re-use and recycling of the labelled containers. Accordingly, the present invention is also directed to a labelled item comprising a label attached onto the surface of the item. The adhesive composition of the present invention provides a long term removability from polar as well as nonpolar substrates defined as clean peel (no residues, no label tear) measured in laboratory conditions up to 6 months.

The following examples are given to further illustrate the invention, without, however, restricting the invention thereto.

EXAMPLES

Example 1—Polymerization 168.8 g of water was introduced into jacketed glass reactor equipped with mechanical agitator, thermometer, reflux condenser, water circulator and heated to 82° C. After desired temperature was reached 40% of a solution comprising of 2.1 g of ammonium persulfate and 50.6 g of water was introduced into reactor as shot. 5 minutes later pre-emulsion prepared with 119.3 g of water and 9 g of an emulsifier (an ammonium salt of ethoxylated fatty alcohol phosphate from Solvay), 6.8 g an emulsifier (sodium salt of ethoxylated fatty alcohol sulfate from Solvay), 2.81 g an emulsifier (sodium salt of dioctyl sulfosuccinate from Solvay), 5.6 g of AA (prop-2-enoic acid), 5.6 g of AM (prop-2-enamide), 75.8 g of BA (butyl prop-2-enoate), 475.7 g of EHA (2-ethylhexyl prop-2-enoate) was introduced to the rector within 4 h using peristaltic pump along with remaining initiator solution. After completion of addition, the raw latex was hold for an hour at 83° C. Next, the temperature was decreased to 60° C. and a solution of 0.2 g of TBHP in 2.25 g of water was introduced into reactor as a shot. Subsequently, a solution of 0.2 g of SFS in 2.25 g of water was introduced to the reactor dropwise within 20 min.

After redox stage, the batch was cooled down to room temperature and pH adjusted to 7 with ammonia. Final product was discharged through 200 mesh filter bag and characterized: solids 61%, Brookfield viscosity @ 100 rpm RV L2 80 cP, grit <100 ppm @ 50 micron mesh, particle size distribution D10=440 nm, D50=685 nm, D90=1060 nm via laser diffraction technique (latex 1).

Example 2

In addition to the polymer produced in Example 1 (Latex 1), the polymers latex 2, latex 3 and latex 4 were produced adapting the process disclosed in Example 1. The monomer composition (%) of the latex-polymers 1 to 4 are shown in Table 1.

TABLE 1

| Monomer | AA | MMA | BA | EHA | HEMA | DAAM | AM |
|---|---|---|---|---|---|---|---|
| Latex 1 | 1 | | 13 | 85 | | | 1 |
| Latex 2 | 1 | | 13 | 84 | | 1 | |

TABLE 1-continued

| Monomer | AA | MMA | BA | EHA | HEMA | DAAM | AM |
|---------|-----|-----|-----|------|------|------|-----|
| Latex 3 | 1 | 6 | | 90.5 | 1.5 | 1 | |
| Latex 4 | 1 | 6 | | 90.5 | 1.5 | | 1 |

AA = acrylic acid (prop-2-enoic acid)

MMA = methyl methacrylate (methyl 2-methylprop-2-enoate)

BA = butyl acrylate (butyl prop-2-enoate)

EHA = 2-ethylhexyl acrylate (2-ethylhexyl prop-2-enoate)

HEMA = hydroxyethyl methacrylate (2-hydroxyethyl 2-methylprop-2-enoate)

DAAM = diacetone acrylamide (N-(2-methyl-4-oxopentan-2-yl)prop-2-enamide

AM = acrylamide (prop-2-enamide)

Example 3

The ability of the latex-polymers 1 to 4 were tested for short term peel force (20 minutes and 24 hours) from cardboard (CB) and PET according to FINAT standard (2014) FTM2 Peel adhesion (90°). In addition, the polymers were tested for adhesion to cardboard (CB) according to FINAT standard FTM9 Loop tack. "Peel adhesion" refers to a measure of a polymer's ability to wet out a surface and subsequently adhere to the substrate i.e., quantify the permanence of the adhesion or peel ability of the polymer. Peel adhesion is defined as the force required to remove polymer coated material from a standard test plate after a certain dwell time at an angle of 90 degree or 180 degree and a specified speed. "Tack" refers to the holding power (adhesion) of a polymer upon contact with a substrate. Tack can be measured by loop tack measurement according to FINAT Test Method no. 9. The loop tack value of an adhesive is expressed as the force required to separate, at specified speed, a loop of material brought into contact with a specified area of a standard surface. The results are shown in Table 2.

TABLE 2

| | Loop tack CB [N] | Peel CB (20 min) [N] | Peel PET (20 min) [N] | Peel CB (24 h) [N] | Peel PET (24 h) [N] |
|---------|------|------|------|------|------|
| Latex 1 | 4.1 | 1.8 | 2.3 | 1.9 | 2.5 |
| Latex 2 | 5.2 | 2.7 | 4.3 | 2.44 | 4.7 |
| Latex 3 | 5.4 | 3 | 6.2 | 3.3 | 6.3 |
| Latex 4 | 3.9 | 1.8 | 3.8 | 2 | 3.8 |

The removability of the latex-polymers 1 to 4 from PET after 1, 2, 3 and 4 weeks was also tested. The results are shown in Table 3.

TABLE 3

| | Removability 1 week PET | Removability 2 week PET | Removability 3 week PET | Removability 4 week PET |
|---------|------|------|------|------|
| Latex 1 | 2 | 2-3 | 3 | 3-4 |
| Latex 2 | 3-4 | 4 | 4-5 | 4-5/PT |
| Latex 3 | 5PT | 5PT | 5PT | 5PT |
| Latex 4 | 2-3 | 3 | 3-4 | 4-5 |

In addition, the removability of the latex-polymers 1 to 4 from cardboard (CB) after 1, 2, 3 and 4 weeks was also tested. The results are shown in Table 4.

TABLE 4

| | Removability 1 week CB | Removability 2 week CB | Removability 3 week CB | Removability 4 week CB |
|---------|------|------|------|------|
| Latex 1 | 2-3 | 2-3 | 3 | 3-4 |
| Latex 2 | 3 | 4 | 4 | 4 |
| Latex 3 | 4-5 | 5PT | 5PT | 5PT |
| Latex 4 | — | — | — | — |

These polymers can be used as a base to formulate an adhesive by adding waxes and optionally plasticisers and/or tackifiers.

As can be seen from the results the polymers differ in adhesion to different substrates. All polymers exhibit excellent short-term adhesion. The peel force is identical after 20 min and 24 h for each polymer. Further, addition of polar monomers such as MMA and HEMA boosts up adhesion to polar substrates like PET. DAAM promotes adhesion to CB as well as to polar substrates such as PET. AM reduces polymer ability to flow and wet out rough substrates like CB in contrast to DAAM.

Example 4

Adhesive compositions having the formulations presented in Table 5 were prepared. Latex 1 is the polymer produced in Example 1.

TABLE 5

| | Formulation | | | | | |
|---------|------|------|------|------|------|------|
| | 1 | 2 | 3 | 4 | 5 | 6 |
| Latex 1 [%] | 90.5 | 91.5 | 85.5 | 95.5 | 89.5 | 91.5 |
| Wax [%] | 7 | 4 | 10 | 4 | 10 | 7 |
| Plasticiser [%] | 2 | 4 | 4 | 0 | 0 | 1 |

Example 5

The adhesive formulations 1-6 described in Example 4 were tested according to FINAT standards (2014): FTM2 Peel adhesion (90°) and FTM9 Loop tack.

"Peel adhesion" refers to a measure of an adhesive's ability to wet out a surface and subsequently adhere to the substrate i.e., quantify the permanence of the adhesion or peel ability of the adhesive. Peel adhesion is defined as the force required to remove adhesive coated material from a standard test plate after a certain dwell time at an angle of 90 degree or 180 degree and a specified speed.

"Tack" refers to the holding power (adhesion) of an adhesive upon contact with a substrate. Tack can be measured by loop tack measurement according to FINAT Test Method no. 9. The loop tack value of an adhesive is expressed as the force required to separate, at specified speed, a loop of material brought into contact with a specified area of a standard surface.

It can be seen from the results shown in FIG. 1 that by adjusting the ratio of wax and plasticizer to latex, the adhesion level to variety of substrates can be modified. The adhesive reaches its final strength already after 20 minutes from application what is manifested by stable values of peel force after 24 h.

Example 6

Adhesives according to recipes A and B were coated on three different paper faces (coated paper, non-coated paper and non-top coated thermal paper).

Adhesive A contains 2.1% amide wax (MÜNZING CHE-MIE GmbH, Germany). It does not contain plasticizers. Adhesive B contains 3.6% amide wax (MÜNZING CHE-MIE GmbH, Germany) and 1.6% plasticizer (Eastman, USA).

The acrylic polymer component in both adhesives A and B is latex 1 described in Example 1.

The adhesives A and B were tested for peel force from the paper faces according to FINAT standard (2014) FTM2 Peel adhesion (90°) after 24 hours, 2 weeks and 4 weeks dwell time at 23° C. and 50% relative humidity. In addition, the adhesives were tested for adhesion to cardboard (CB) according to FINAT standard (2014) FTM9 Loop tack. The results are shown in Table 6.

TABLE 6

| | | Coated paper face/ Adhesive A/[N] | Non-coated paper/ Adhesive A/[N] | Non top-coated thermal face-paper/ Adhesive A/[N] | Coated paper face/ Adhesive B/[N] | Non-coated paper/ Adhesive B/[N] | Non top-coated thermal face-paper/ Adhesive B/[N] |
|---|---|---|---|---|---|---|---|
| Immediate | Tack glass | 3.0 | 3.0 | 2.7 | 2.9 | 3.4 | 2.7 |
| | Tack HDPE | 3.3 | 2.9 | 2.7 | 3.0 | 3.0 | 2.5 |
| Dwell time 24 h | Peel glass RT | 2.6 | 2.3 | 2.0 | 2.4 | 1.9 | 1.8 |
| | Peel PET RT | 1.6 | 1.7 | 1.5 | 1.4 | 1.6 | 1.4 |
| Dwell time 2 weeks | Peel glass at RT | 2.0 | 2.2 | 2.0 | 1.9 | 2.0 | 1.8 |
| | Peel PET at RT | 1.6 | 1.7 | 1.4 | 1.3 | 1.5 | 1.4 |
| Dwell time 4 weeks | Peel glass at RT | 2.1 | 2.3 | 2.1 | 2.2 | 2.4 | 2.1 |
| | Peel PET at RT | 1.9 | 2.0 | 1.6 | 1.5 | 1.7 | 1.6 |

The adhesives gave soft unchanging peel over the tested time period of 4 weeks.

Example 7—Long-Term Removability

The natural and accelerated aging of the adhesives of the invention were tested. The adhesives comprised 91.5% latex 1, 7% amide wax and 1% plasticizer. The emulsifier was an ammonium salt of ethoxylated fatty alcohol phosphate from Solvay (A), potassium salt of ethoxylated fatty alcohol phosphate from Solvay (B) or dodecyl benzene sulfonate sodium salt from Solvay (XC).

Natural ageing: 5 cm×5 cm labels were labeled onto selected substrates and peeled off manually according to schedule presented in table 7.

Accelerated ageing: 5 cm×5 cm labels were labeled onto selected substrates and kept under load of 8 kg in climate chamber at 50° C. and 75% relative humidity for a week.

Subjective feeling of force required to peel off each sample was recorded according to following criteria:

1—very low force
2—low force
3—moderate force
4—high force
5—very high force

If label was torn during peeling, it was noted as PT

Results: The adhesives according to the invention exhibit excellent removability over long period of time form different substrates. Removability is also preserved after accelerated ageing proving good stability of the adhesive. The results are presented in Table 7.

TABLE 7

| Time/Substrate | A | B | C |
|---|---|---|---|
| 1 week/cardboard | 1-2 | 1-2 | 2 |
| 1 week/PET | 1-2 | 1-2 | 1-2 |

TABLE 7-continued

| Time/Substrate | A | B | C |
|---|---|---|---|
| 1 week/glass | 2 | 2 | 2-3 |
| 2 weeks/cardboard | 1-2 | 1-2 | 2 |
| 2 weeks/PET | 1-2 | 1-2 | 2 |
| 2 weeks/glass | 2 | 2-3 | 2-3 |
| 3 weeks/cardboard | 1-2 | 1-2 | 2 |
| 3 weeks/PET | 1-2 | 1-2 | 2 |
| 3 weeks/glass | 2-3 | 2-3 | 3 |
| 4 weeks/cardboard | 1-2 | 1-2 | 2 |
| 4 weeks/PET | 1-2 | 1-2 | 2 |
| 4 weeks/glass | 2-3 | 3 | 3-4 |
| 24 weeks/cardboard | 3 | 2-3 | 2-3 |

TABLE 7-continued

| Time/Substrate | A | B | C |
|---|---|---|---|
| 24 weeks/PET | 2 | 2 | 2-3 |
| 24 weeks/glass | 2-3 | 3 | 4 |
| 1 week/cardboard 50° C., RH: 75% | 3 | 3 | 3-4 |
| 1 week/PET 50° C., RH: 75% | 3 | 3 | 3-4 |
| 1 week/glass 50° C., RH: 75% | 3-4 | 3-4 | 3-4 |

Example 8

Removability of the acrylic polymer and different adhesive compositions were tested.

The polymer (latex 1) and adhesives A, B, C, D, E, F, G and H were tested for peel force from PET and cardboard (CB) according to FINAT standard FTM2 Peel adhesion (90°) after 24 hours dwell time at RT. In addition, the adhesives were tested for adhesion to glass and HDPE (high-density polyethylene) according to FINAT standard FTM9 Loop tack. The results are shown in Table 8. As can be concluded from the results, the adhesive/peel off balance can be fine-tuned in the composition.

TABLE 8

| | Latex 1 | A | B | C | D | E | F | G | H |
|---|---|---|---|---|---|---|---|---|---|
| Tack glass | 5.4 | 4.2 | 4.8 | 4.1 | 5.7 | 6.2 | 4.4 | 3.9 | 5.1 |
| Tack HDPE | 5.0 | 5.2 | 4.7 | 5.0 | 5.6 | 5.6 | 4.2 | 4.1 | 4.7 |
| Peel PET 24 h | 3.3 | 1.9 | 2.4 | 2.2 | 3.3 | 3.8 | 2.0 | 1.9 | 2.6 |
| Peel CB 24 h | 2.2 | 2.0 | 2.3 | 2.0 | 2.5 | 2.9 | 2.3 | 2.5 | 2.4 |

A refers to an adhesive composition of latex 1+3.6 d % amide wax+1.6 d % plasticizer.

B refers to an adhesive composition of latex 1+2.1 d % amide wax.

C refers to an adhesive composition of latex 1+2.1 d % amide wax+1.6 d % plasticizer.

D refers to an adhesive composition of latex 1+4 d % tackifier.

E refers to an adhesive composition of latex 1+8 d % tackifier.

F refers to an adhesive composition of latex 1+3.6 d % amide wax+4 d % tackifier.

G refers to an adhesive composition of latex 1+3.6 d % amide wax+1.6% plasticizer+4 d % tackifier.

H refers to an adhesive composition of latex 1+2.1 d % amide wax+4 d % tackifier.

Example 9

Hand removability tests of the acrylic polymer and different adhesive compositions on Cardboard and PET were performed after 24 hours and 2 weeks.

Latex 1 refers to the polymer produced in Example 1. Composition 1 contains latex 1 and amide wax (EBS, Munzig, Germany).

Composition 2 contains latex 1 and amide wax (EBS, keim additec surface GmbH, Germany). Composition 3 contains latex 1 and modified amide wax (modified EBS, keim additec surface GmbH, Germany).

Compositions 1, 2 and 3 contained the same amount of amide wax.

The results are shown in Table 9. As can be concluded from the results the hand peeled removability was on very similar level regardless the used amide wax type.

TABLE 9

|  | Latex 1 | Composition 1 | Composition 2 | Composition 3 |
| --- | --- | --- | --- | --- |
| Cardboard 24 h | 2.6 | 2.3 | 2.5 | 2.3 |
| PET 24 h | 3 | 2.3 | 2.5 | 2.4 |
| Cardboard 2 weeks | 2.8 | 2 | 2.5 | 2 |
| PET 2 weeks | 3.1 | 2.5 | 2.7 | 2.3 |

Example 10—Dynamic Mechanical Analysis (DMA)

DMA was used to characterize the properties of the polymer and the adhesive compositions as a function of temperature.

The viscoelastic properties of the adhesive compositions of the invention were determined with DMA by means of a temperature sweep. The temperature sweep may be used to determine a number of characteristics of an adhesive composition, such as glass transition temperature Tg, wet ability, adhesion potential, elasticity or cohesion. In an oscillation temperature sweep, the deformation amplitude and the frequency are kept constant. In oscillation temperature sweep, the loss modulus G" and the storage modulus G', in units of Pascal (Pa), are plotted against the varied parameter. In oscillation temperature sweep, the varied parameter is temperature, in units of Celsius grade (° C.). The equipment used in the measurements was Anton Paar MCR 302 rheometer with liquid N2 cooling, 8 mm parallel plate measurement geometry and 1 mm sample thickness.

In the temperature sweep the following parameters were selected:

Constant frequency of 1 Hz and amplitude of 0.1%

Temperature ramp 2° C./min from −60 to +100° C.

The measurements were performed in accordance with ISO standard 6721-10 (version 2015). The DMA measurement geometry details thus were parallel plate PP08, with 1 mm gap and 8 mm diameter (measurement head serial #32863).

Figure 2:
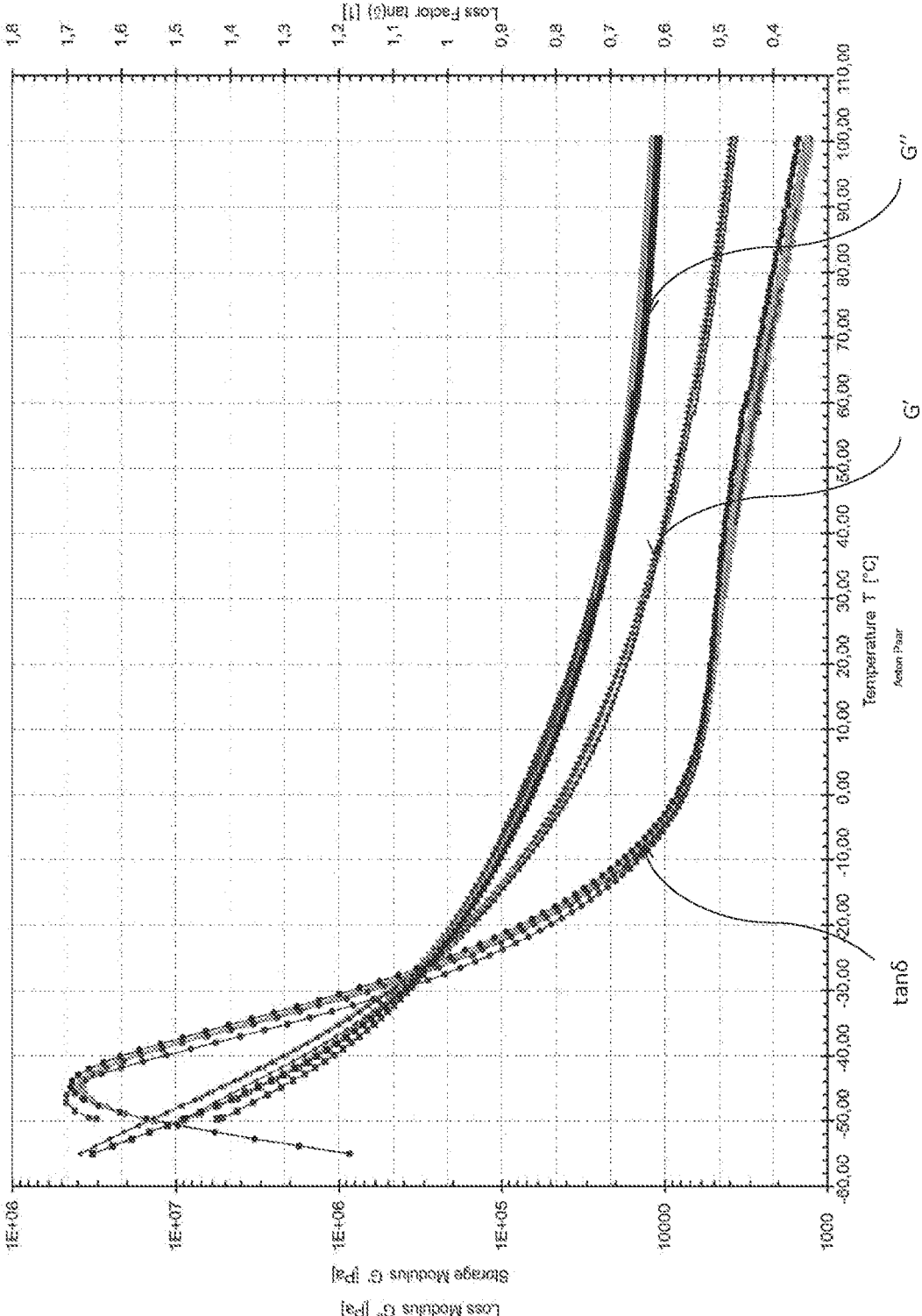
FIG. 2 shows the DMA temperature sweep for the polymer latex 1 and compositions containing the polymer latex 1 and amide wax.

FIG. 2 indicates the results of a temperature sweep experiment performed on the polymer latex 1 and three adhesive compositions of the invention, which all contained the same polymer (latex 1), but different amide wax. The curves G', G" and tan δ represent the behaviour of the polymer as well as the adhesive compositions storage and loss moduli as a function of temperature (FIG. 2). The horizontal axis in FIG. 2 indicates the temperature, in units of Celsius (° C.). The vertical axis on the left side indicates the value of loss modulus G" and storage modulus G', in units of Pascal. The vertical axis on the right side indicates the determined value of the loss factor tan δ. The temperature sweep demonstrated that all adhesive compositions behave very similarly. In every case G' is below 40 000 Pa at 23° C.

In addition, in Table 10 results of DMA temperature sweep of the polymer, latex 1 as such and in combination with a tackifier, as well as the adhesive compositions of the invention are presented.

TABLE 10

| Sample | Tg | G', G", tan(δ), at +23° C. | G', G", tan(δ), at +100° C. |
| --- | --- | --- | --- |
| Latex 1 | −44.8 | 30706 | 11108 |
|  |  | 15688 | 3928.6 |
|  |  | 0.511 | 0.354 |
| Latex 1 + 4 d % tackifier | −42.7 | 27478 | 10905 |
|  |  | 13874 | 3143.8 |
|  |  | 0.505 | 0.288 |
| Latex 1 + 8 d % tackifier | −38.7 | 26781 | 9582.8 |
|  |  | 14401 | 2977.4 |
|  |  | 0.538 | 0.311 |
| Latex 1 + modified EBS (keimadditec surface GmbH) | −46.0 | 33764 | 11233 |
|  |  | 17110 | 3786.6 |
|  |  | 0.507 | 0.337 |
| Latex 1 + EBS (MUNZIG CHEMIE GmbH) | −44.7 | 31534 | 11319 |
|  |  | 16011 | 3820.9 |
|  |  | 0.508 | 0.338 |
| Latex 1 + EBS (keimadditec surface GmbH) | −44.6 | 33435 | 10863 |
|  |  | 17191 | 3630.9 |
|  |  | 0.514 | 0.334 |
| Latex 1 + 3.6 d % EBS + 4 d % tackifier | −41.7 | 32058 | 12682 |
|  |  | 16196 | 3727.2 |
|  |  | 0.505 | 0.294 |
| Latex 1 + 3.6 d % EBS + plasticizer + 4 d % tackifier | −42.7 | 28916 | 11775 |
|  |  | 14435 | 3359.6 |
|  |  | 0.499 | 0.285 |
| Latex 1 + 2.1 d % EBS + 4 d % tackifier | −41.7 | 28174 | 11911 |
|  |  | 14212 | 3749.7 |
|  |  | 0.504 | 0.315 |

As can be seen from the results, wax in the formulation did not change viscoelasticity of the composition. The samples kept their low Tg and soft, however, elastic properties. The samples stayed stabile to high temperatures. The tested amide waxes seemed to behave in very similar way.

Tackifier addition promotes adhesion by raising tan δ peak height and lowering G". Tackifier+wax combinations seemed to tune the compositions to a bit more elastic direction, tan δ lower at higher temperatures. However, Tg is fairly low and the formulation is soft and elastic and the structure stays stabile to high temperatures, which is an advantage in removable application. Whereas in case of general purpose permanent adhesive Tg is typically above −25° C. and level of G' and G" at 23° C. are above 50 000 Pa and above 25 000 Pa, respectively.

Example 11—DMA Analysis Using Chan Window

In order to design removable adhesives the concept of adhesive operation window described by E. P. Chang (E. P. Chang (1997) Viscoelastic Properties of Pressure-Sensitive Adhesives, The Journal of Adhesion, 60:1-4, 233-248) is often applied. According to Chang ideally removable adhesive composition should have both G' and G" smaller than 30 000 Pa at angular frequency of 100 rad/s, which ensures the location in Quadrant 3 in the Chang window.

The viscoelastic properties of the adhesive compositions of the invention were further characterized with oscillation frequency sweep. The frequency sweep may be used to determine the response of a composition to timescale dependent behavior. In an oscillation frequency sweep, the deformation amplitude and temperature are kept constant. In oscillation frequency sweep, the loss modulus G" and the storage modulus G', in units of Pascal (Pa), are plotted against the varied parameter. In oscillation frequency sweep, the varied parameter is angular frequency ω, in units of radians per second (rad/s). The loss factor tan δ is the ratio of the loss modulus G" to the dynamic storage modulus G', in other words, tan δ=G"/G'.

In this example, the viscoelastic properties of the adhesive compositions of the invention as well as the viscoelastic properties of the polymer (latex 1) were determined with DMA by means of a frequency sweep. The equipment used in the measurements was Anton Paar MCR 302 rheometer with liquid N2 cooling, 8 mm parallel plate measurement geometry and 1 mm sample thickness.

In the frequency sweep, the following parameters were selected:

Constant amplitude 0.5%

Angular frequency 1 to 50 rad/s at temperatures −5, +5, +15, +25, +45, +75 and +100° C.

The measurements were performed in accordance with ISO standard 6721-10 (version 2015). The DMA measurement geometry details thus were parallel plate PP08, with 1 mm gap and 8 mm diameter (measurement head serial #32863).

Reference is made to FIGS. 4 and 5, which illustrates by way of a Chang window the viscoelastic properties of adhesive compositions of the invention as well as the acrylic polymer (latex 1). The horizontal axis represents the dynamic loss modulus G" in units of Pascal. The vertical axis represents the dynamic storage modulus G' in units of Pascal. Both the axes have been drawn in logarithmic scale. The diagonal line represents the loss factor tan δ, which refers to the ratio of the loss modulus G" to the storage modulus G'.

FIG. 3 shows the Chang windows for the polymer, latex 1.

FIG. 4 shows the Chang windows for latex 1 and the adhesive compositions 1, 2 and 3.

FIG. 5 shows the Chang windows for latex 1, a general purpose adhesive and two removable adhesive compositions according to the invention.

In FIG. 4, composition 1 contains latex 1 and 2.1 d % EBS (MUNZIG CHEMIE GmbH, Germany), composition 2 contains latex 1 and 2.1 d % EBS (keim additec surface GmbH, Germany) and composition 3 contains latex 1 and 2.1 d % modified EBS (keim additec surface GmbH, Germany).

In FIG. 5, composition 4 contains latex 1 and 2.1 d % amide wax, 4d % tackifier, and composition 5 contains latex 1 and 3.6 d % amide wax, 1.6% plasticizer and 4 d % tackifier.

As can be seen from FIG. 3, the acrylic polymer of the invention satisfies the requirements with following coordinates of operating window:

| G' @ 0.01 rad/s | G" @ 0.01 rad/s | G' @ 100 rad/s | G" @ 100 rad/s |
|---|---|---|---|
| 8451 Pa | 1557 Pa | 53819 Pa | 31166 Pa |

As can be seen from FIGS. 4 and 5, the Chang windows of the removable adhesive compositions of the invention are almost identical and are mainly located in the lower left quadrant of the Chang window. In addition, their location differs from the one of a general purpose adhesive. Further, when comparing the position of the Chang window with the tan δ-line it can be noticed that the adhesives have good removability.

The invention claimed is:

1. A removable adhesive composition comprising an acrylic polymer, an amide wax having a particle size distribution of 0.5-20 μm and optionally a plasticizer and/or a tackifier, wherein the acrylic polymer comprises 70% to 99% by weight of at least one C5 to C10 alkyl (meth) acrylate, 0.5% to 5% by weight of at least one monomer having at least one acid or acid anhydride group, 0.5% to 5% by weight of at least one monomer having at least one amide group, 0% to 20% by weight of at least one C1 to C4 alkyl (meth)acrylate and 0% to 5% by weight of at least one hydroxyalkyl (meth)acrylate.

2. The adhesive composition of claim 1 comprising:
   the water based acrylic polymer in an amount of 78-98% based on the dry weight of the adhesive composition,
   the amide wax in an amount of 2-22% based on the dry weight of the adhesive composition,
   the plasticizer in an amount of 0-10% based on the dry weight of the adhesive composition, and
   the tackifier in an amount of 0-15% based on the dry weight of the adhesive composition.

3. The adhesive composition of claim 2 comprising:
   the water based acrylic polymer in an amount of 90-98% based on the dry weight of the adhesive composition,
   the amide wax in an amount of 2-10% based on the dry weight of the adhesive composition, and
   the plasticizer in an amount of more than 0 to 3% based on the dry weight of the adhesive composition.

4. The adhesive composition of claim 1, wherein the amide wax is selected from amide waxes having a softening point in the range of 85-151° C.

5. The adhesive composition of claim 1, wherein the amide wax is selected from ethylene-bis-stearamide (EBS), a modified EBS or mixtures thereof.

6. The adhesive composition of claim 1, wherein the acrylic polymer comprises 2-ethylhexyl acrylate (EHA), acrylic acid (AA) and acryl amide (AM) and/or diacetone acrylamide (DAAM) and optionally butyl acrylate (BA), methyl methacrylate (MMA) and/or hydroxyethyl methacrylate (HEMA).

7. The adhesive composition of claim 1, wherein the amount of an insoluble fraction of the polymer in the composition is at least 60.

8. The adhesive composition of claim 1, wherein the adhesive composition exhibits G' below 40 000 Pa at 100 rad/s at 25° C.

9. The adhesive composition of claim 1, wherein the adhesive composition exhibits G" below 20 000 Pa at 100 rad/s at 25° C.

10. The adhesive composition of claim 1, wherein the adhesive composition has the loss factor, tan δ, above 0.3 at 100 rad/s at 25° C.

11. The adhesive composition of claim 1, wherein the adhesive composition has the glass transition temperature (Tg) below −30° C.

12. The adhesive composition of claim 11, wherein the adhesive composition has the glass transition temperature (Tg) between −50° C. and −30° C.

13. The adhesive composition of claim 1, wherein the adhesive composition exhibits 90° peel on PET below 7 N with a coated paper when measured according to FINAT standard (2014) FTM2 Peel adhesion (90°).

14. The adhesive composition of claim 1, wherein the adhesive composition exhibits tack below 7 N with a coated paper, when measured according to FINAT standard (2014) FTM9 Loop Tack.

15. A label laminate comprising a face layer, an adhesive layer and a release liner, wherein the adhesive layer comprises the adhesive composition of claim 1.

16. A label comprising a face layer and an adhesive layer comprising an adhesive composition comprising an acrylic emulsion, an amide wax having a particle size distribution of 0.5-20 μm and optionally a plasticizer and/or a tackifier, wherein the acrylic polymer of the adhesive composition comprises 70% to 99% by weight of a C5 to C10 alkyl (meth)acrylate, 0.5% to 5% by weight of a monomer having at least one acid or acid anhydride group, 0.5% to 5% by weight of a monomer having at least one amide group, 0% to 20% by weight of a C1 to C4 alkyl (meth)acrylate and 0% to 5% by weight of a hydroxyalkyl (meth)acrylate.

17. The label according to claim 16, wherein the adhesive composition comprises:

the water based acrylic polymer in an amount of 78-98% based on the dry weight of the adhesive composition, the amide wax in an amount of 2-22% based on the dry weight of the adhesive composition, the plasticizer in an amount of 0-10% based on the dry weight of the adhesive composition, and the tackifier in an amount of 0-15% based on the dry weight of the adhesive composition.

18. The label according to claim 17, wherein the adhesive composition comprises:

the water based acrylic polymer in an amount of 90-98%, based on the dry weight of the adhesive composition, the amide wax in an amount of 2-10%, based on the dry weight of the adhesive composition, and the plasticizer in an amount of more than 0-3%, based on the dry weight of the adhesive composition.

19. The label of claim 16, wherein the amide wax of the adhesive composition is selected from amide waxes having a softening point in the range of 85-151° C.

20. The label of claim 19, wherein the adhesive composition has the glass transition temperature (Tg) below −30° C., between −50° C. and −30° C.

21. The label of claim 16, wherein the amide wax of the adhesive composition is selected from ethylene-bis-stearamide (EBS), a modified EBS or mixtures thereof.

22. The label of claim 16, wherein the acrylic polymer of the adhesive composition comprises 2-ethylhexyl acrylate (EHA), acrylic acid (AA) and acryl amide (AM) and/or diacetone acrylamide (DAAM) and optionally butyl acrylate (BA), methyl methacrylate (MMA) and/or hydroxyethyl methacrylate (HEMA).

23. The label of claim 16, wherein the amount of an insoluble fraction in the adhesive composition is at least 60%.

24. The label of claim 16, wherein the adhesive composition exhibits G' below 40 000 Pa at 100 rad/s at 25° C.

25. The label of claim 16, wherein the adhesive composition exhibits G" below 20 000 Pa at 100 rad/s at 25° C.

26. The label of claim 16, wherein the adhesive composition has the loss factor, tan δ, above 0.4 at 100 rad/s at 25° C.

27. The label of claim 16, wherein the adhesive composition has the glass transition temperature (Tg) below −30° C.

28. The label of claim 16, wherein the adhesive composition exhibits 90° peel on PET below 7 N with a coated paper when measured according to FINAT standard (2014) FTM2 Peel adhesion (90°).

29. The label of claim 16, wherein the adhesive composition exhibits tack below 7 N with a coated paper, when measured according to FINAT standard (2014) FTM9 Loop Tack.

30. A labelled item comprising a label according to claim 16 attached onto the surface of the item.

* * * * *